(12) United States Patent
Funahashi et al.

(10) Patent No.: US 7,958,553 B2
(45) Date of Patent: Jun. 7, 2011

(54) INFORMATION STORAGE DEVICE, SECURITY SYSTEM, ACCESS PERMISSION METHOD, NETWORK ACCESS METHOD AND SECURITY PROCESS EXECUTION PERMISSION METHOD

(75) Inventors: Takeshi Funahashi, Saitama (JP); Sakiko Nagato, Tokyo (JP)

(73) Assignee: Sony Corporation, Tokyo (JP)

( * ) Notice: Subject to any disclaimer, the term of this patent is extended or adjusted under 35 U.S.C. 154(b) by 1212 days.

(21) Appl. No.: 11/036,166

(22) Filed: Jan. 14, 2005

(65) Prior Publication Data

US 2005/0182973 A1 Aug. 18, 2005

(30) Foreign Application Priority Data

Jan. 23, 2004 (JP) ................................ P2004-016280

(51) Int. Cl.
*G06F 7/04* (2006.01)
*H04L 9/32* (2006.01)

(52) U.S. Cl. ................. 726/19; 726/9; 726/20; 713/172

(58) Field of Classification Search .................. 726/2–9, 726/16, 26–30; 713/172
See application file for complete search history.

(56) References Cited

U.S. PATENT DOCUMENTS

| | | | | |
|---|---|---|---|---|
| 5,493,613 A | * | 2/1996 | Denno et al. | 705/73 |
| 6,061,790 A | * | 5/2000 | Bodnar | 713/171 |
| 6,549,490 B1 | * | 4/2003 | Howarth | 369/30.27 |
| 6,567,919 B1 | * | 5/2003 | Yanagihara et al. | 726/7 |
| 7,272,723 B1 | | 9/2007 | Abbott et al. | |
| 2001/0021980 A1 | * | 9/2001 | Linden et al. | 713/200 |
| 2001/0025340 A1 | * | 9/2001 | Marchant | 713/150 |
| 2001/0027529 A1 | * | 10/2001 | Sasabe et al. | 713/202 |
| 2003/0070102 A1 | * | 4/2003 | Kondo | 713/202 |
| 2004/0103288 A1 | * | 5/2004 | Ziv et al. | 713/185 |
| 2004/0123127 A1 | * | 6/2004 | Teicher et al. | 713/193 |
| 2004/0250066 A1 | * | 12/2004 | Di Luoffo et al. | 713/168 |
| 2006/0075485 A1 | * | 4/2006 | Funahashi et al. | 726/19 |

FOREIGN PATENT DOCUMENTS

| | | |
|---|---|---|
| EP | 1336914 | 1/2003 |
| JP | 11-282982 A * | 10/1999 |
| JP | 2001-209615 | 8/2001 |
| JP | 2002-041228 | 2/2002 |
| JP | 2002-320031 A * | 10/2002 |
| JP | 2003-044436 | 2/2003 |
| JP | 2003-524842 | 8/2003 |
| JP | 2004-021581 | 1/2004 |
| WO | WO02/056154 | 7/2002 |

OTHER PUBLICATIONS

Machine translation, JP 11-282982 A, translation performed on Dec. 17, 2008.*
EAST JPO translation, JP 11-282982, translation published in 1999.*
"Trusted Computing Platform Alliance (TCPA) Main Specification Version 1.1b" TCPA Main Specification, Feb. 22, 2002.
Bajikar S., "Trusted Platform Module (TPM) based Security on Notebook PCs—White Paper" Jun. 20, 2002.
Japanese Office Action issued on Jan. 19, 2010 for corresponding Japanese Patent Application No. JP2004-016280.
Japanese Office Action issued on Nov. 30, 2010, for corresponding Japanese Appln. No. JP2004-016280.

* cited by examiner

*Primary Examiner* — Hosuk Song
*Assistant Examiner* — Darren B Schwartz
(74) *Attorney, Agent, or Firm* — K&L Gates LLP

(57) ABSTRACT

An information storage device is provided which includes a password input section for inputting a password to be notified only to the information storage device without outputting it to external equipment connected to it by way of a predetermined interface, a password collation section for collating the password input by way of the password input section and an access permission section for permitting an access to the storage section of the device from the external equipment connected by way of the predetermined interface in response to the collation of the password by the password collation section.

14 Claims, 13 Drawing Sheets

INFORMATION STORAGE DEVICE, SECURITY SYSTEM, ACCESS PERMISSION METHOD, NETWORK ACCESS METHOD AND SECURITY PROCESS EXECUTION PERMISSION METHOD

BACKGROUND OF THE INVENTION

The present invention relates to a removable information storage device connected to external equipment by way of a predetermined interface and adapted to write and read data via a predetermined file system. More particularly, the present invention relates to an information storage device provided with an enhanced level of security for accessing the information storage area which the information storage device includes, a security system having such an information storage device, as well as an access permission method, a network access method and a security process execution permission method using such an information storage device.

Removable information storage devices connected to external equipment such as PCs (personal computers) by way of a predetermined interface and having a formation storage device adapted to write and read data via a predetermined file system are being popularly used. Since such an information storage device includes a semiconductor memory such as a large capacity flash memory as the information storage area, it can store a large volume of data if compared with magnetic disc storage mediums that have been very popular and allows data access at high speed.

Such an information storage device is provided with a feature of controlling accesses to the information storage area it includes so that any person other than the proper user, who typically may be the person who has purchased the information storage device, cannot use it. Conventional information storage devices require installation of dedicated application software for controlling accesses to the information storage area in all the PCs authorized to use the information storage device and registration of a password.

For example, when a user purchases such an information storage device, he or she installs the application software for controlling accesses to the information storage area the information storage device includes in all the PCs authorized to be connected to the information storage device for use and registers a password. When the user wants to actually use the information storage device, he or she is authorized to access the information storage area by way of one of the PCs as the user inputs the password through the input interface that may be the keyboard that the PC is equipped with (see, inter alia, Patent Document 1: Jpn. Pat. Appln. Laid-Open Publication No. 2003-524842).

Generally, a security system involving the use of a password to be input by the user provides an advantage of low cost of designing and building the security system because it does not require costly security devices and security application software and an additional advantage of easiness of using the system to the user because the user can define as a password a string of numerals and/or characters that the user can easily memorize.

However, when passwords, that are used for such systems are mostly defined by using strings of numerals and/or characters to a great convenience on the part of users, they also provide an advantage to fraudulent users that they can easily guess the passwords. For example, many users define their passwords, using the numerals of their birthdays or some other numerals that are closely related to them, so that a fraudulent user can easily guess the passwords.

Additionally, such passwords are typically limited to four digit numbers for the purpose of providing easiness of memorizing to users. When the length of passwords is limited in such a way, a fraudulent user may use an application software that is designed to infinitely generate passwords and analyze the password in question. Then, the password will be perfectly analyzed within a very short period of time.

In the case of a security system in which the user can access the information storage area by inputting his or her password by way of the keyboard of the PC connected to the information storage device, the password can be easily stolen by injecting a computer virus such as Trojan Horse for the purpose of illegally acquiring the password.

Thus, a security system that authorizes an access to the information storage area of an information storage device as a password is input by way of a PC connected to the information storage device is a very fragile security system whose security strength is very weak.

SUMMARY OF THE INVENTION

In view of the above identified problems, the present invention seeks to provide an information storage device having a very high security strength, while maintaining the advantage of low cost and user convenience of using a password, and a security system using such an information storage device as well as an access permission method, a network access method and a security process execution permission method using such an information storage device.

In an embodiment of the present invention, an information storage device is provided having a predetermined interface for connecting the device to external equipment and a storage area restricting accesses from the external equipment, the device including: a password input part for inputting a password to be notified only to the information storage device without outputting it to the external equipment connected to it by way of the predetermined interface; a password collation part for collating the password input by way of the password input part; and an access permission part for permitting an access to the storage area from the external equipment connected by way of the predetermined interface in response to the collation of the password by the password collation part.

In another embodiment of the present invention, there is provided an access permission method for permitting an access to a removable information storage device having a predetermined interface for connecting the device to external equipment and a storage area restricting accesses from the external equipment, the method including: inputting a password to be notified only to the information storage device without outputting it to the external equipment connected to it by way of the predetermined interface; collating the input password; and permitting an access to the storage area from the external equipment connected by way of the predetermined interface in response to the collation of the password.

In still another embodiment of the present invention, there is provided a security system including: a server device; a terminal device connected to the server device by way of a network; and a removable information storage device connected to the terminal device by way of a predetermined interface; the information storage device having: a storage area storing an encryption key for encrypting predetermined data and restricting accesses from the terminal device; a password input part for inputting a password to be notified only to the information storage device without outputting it to the terminal device connected to the information storage device; a password collation part for collating the password input by way of the password input part; an access permission part for permitting an access to the storage area from the terminal device connected by way of the predetermined interface in response to the collation of the password by the password collation part; a one-time password generator for generating a one-time password different from any preceding ones according to a predetermined algorithm, using the encryption key stored in the storage area permitted by the access permission part to be accessed and a challenge code transmitted from the server device in response to an access request made by the terminal device to the server device; and a controller for controlling an operation of transmitting the one-time password generated by the one-time password generator to the server device by way of the terminal device connected to the network; the server device having: a verification part for verifying the one-time password transmitted from the information storage device by way of the terminal device connected to the network; an authentication part for authenticating the user requesting an access from the terminal device connected by way of the network according to the outcome of the verification by the verification part; and a network access permission part for permitting an access from the terminal device by way of the network in response to the user authentication by the authentication part.

In still another embodiment of the present invention, there is provided a network access method of a security system including: a server device; a terminal device connected to the server device; and a removable information storage device connected to the terminal device by way of a predetermined interface; the information storage device performing: a password input step of inputting a password to be notified only to the information storage device without outputting it to the terminal device connected to the information storage device; a password collation step of collating the password input in the password input step; an access permission step of permitting an access to the storage area possessed by the information storage device from the terminal device connected by way of the predetermined interface in response to the collation of the password in the password collation step, a one-time password generation step of generating a one-time password different from any preceding ones according to a predetermined algorithm, using an encryption key stored in the storage area permitted to be accessed in the access permission step and a challenge code transmitted from the server device in response to an access request made by the terminal device to the server device; and a control step of controlling an operation of transmitting the one-time password generated in the one-time password generation step to the server device by way of the terminal device connected to the network; the server device performing: a verification step of verifying the one-time password transmitted from the information storage device by way of the terminal device connected to the network; an authentication step of authenticating the user requesting an access from the terminal device connected by way of the network according to the outcome of the verification in the verification step; and a network access permission step of permitting an access from the terminal device by way of the network in response to the user authentication in the authentication step.

In still another embodiment of the present invention, there is provided a security system including: a server device; a terminal device connected to the server device by way of a network; and a removable information storage device connected to the terminal device by way of a predetermined interface; the terminal device having: a security chip storing a first encryption key to be requested for at the time of executing a predetermined security process in the terminal device; the information storage device having: a storage area storing a second encryption key identical with the first encryption key and restricting accesses from the terminal device; a password input part for inputting a password to be notified only to the information storage device without outputting it to the terminal device connected to the information storage device; a password collation part for collating the password input by way of the password input part; an access permission part for permitting an access to the storage area from the terminal device connected by way of the predetermined interface in response to the collation of the password by the password collation part; and a controller for controlling an operation of encrypting the challenge code transmitted from the server device via the second encryption key in response to an access request made by the terminal device to the server device and transmitting it to the server device by way of the terminal device connected to the network; the server device having: a verification part for verifying the challenge code encrypted by the second encryption key and transmitted from the information storage device by way of the terminal device connected to the network; an authentication part for authenticating the user requesting an access from the terminal device connected by way of the network according to the outcome of the verification by the verification part; and an execution permission part for permitting execution of the predetermined security process using the first encryption key in the terminal device in response to the user authentication by the authentication part.

In a further embodiment of the present invention, there is provided a security process execution permission method of a security system having: a server device; a terminal device connected to the server device by way of a network; and a removable information storage device connected to the terminal device by way of a predetermined interface; the information storage device performing: a password input step of inputting a password to be notified only to the information storage device without outputting it to the terminal device connected to the information storage device; a password collation step of collating the password input in the password input step; an access permission step of permitting an access to the storage area possessed by the information storage device from the terminal device connected by way of the predetermined interface in response to the collation of the password in the password collation step; and a control step of controlling an operation of encrypting the challenge code transmitted from the server device via a second encryption key identical with a first encryption key to be requested when executing a predetermined security process in the terminal device in response to an access request made by the terminal device to the server device, the first encryption key being stored in a security chip possessed by the terminal device, and transmitting it to the server device by way of the terminal device connected to the network; the server device performing: a verification step of verifying the challenge code encrypted by the second encryption key and transmitted from the information storage device by way of the terminal device connected to the network; an authentication step of authenticating the user requesting an access from the terminal device connected by way of the network according to the outcome of the verification in the verification step; and an execution permission step of permitting execution of the predetermined security process using the first encryption key in the terminal device in response to the user authentication in the authentication step.

Thus, the password input via the password input part of an information storage device according to the present invention is not output to external equipment connected to it by way of a predetermined interface but notified only to the information storage device and the external equipment is permitted to access the storage area of the information storage device depending on the outcome of an operation of collating the input password.

As a result, risk of leaking the password through external equipment is completely eliminated if a highly convenient password of a known type is used. Therefore, it is possible to protect the storage area with an enhanced security level.

Additionally, when an information storage device according to the present invention is provided with a one-time password generator, it can be applied to a system for accessing a network by using a one-time password. Then, it is possible to authenticate the user without requiring the user to input a password by way of a terminal device so that the user can access a network with a highly enhanced security level.

Additionally, when the storage area of an information storage device according to the present invention is adapted to store a second encryption key that is identical with a first encryption key stored in a security chip that is mounted in a terminal device, the encryption key can be applied to the operation of authenticating the user at the terminal device mounted with the security chip so that it is possible to authenticate the user without requiring the user to input a password by way of the terminal device. As such, it is possible to execute a security processing operation at the terminal device with a highly enhanced security level.

Additional features and advantages of the present invention are described in, and will be apparent from, the following Detailed Description of the Invention and the Figures.

BRIEF DESCRIPTION OF THE FIGURES

FIG. 11 is a schematic illustration of a security chip that a PC connected to a third embodiment of the storage medium is provided with.

DETAILED DESCRIPTION OF THE INVENTION

1st Embodiment

Figure 1:
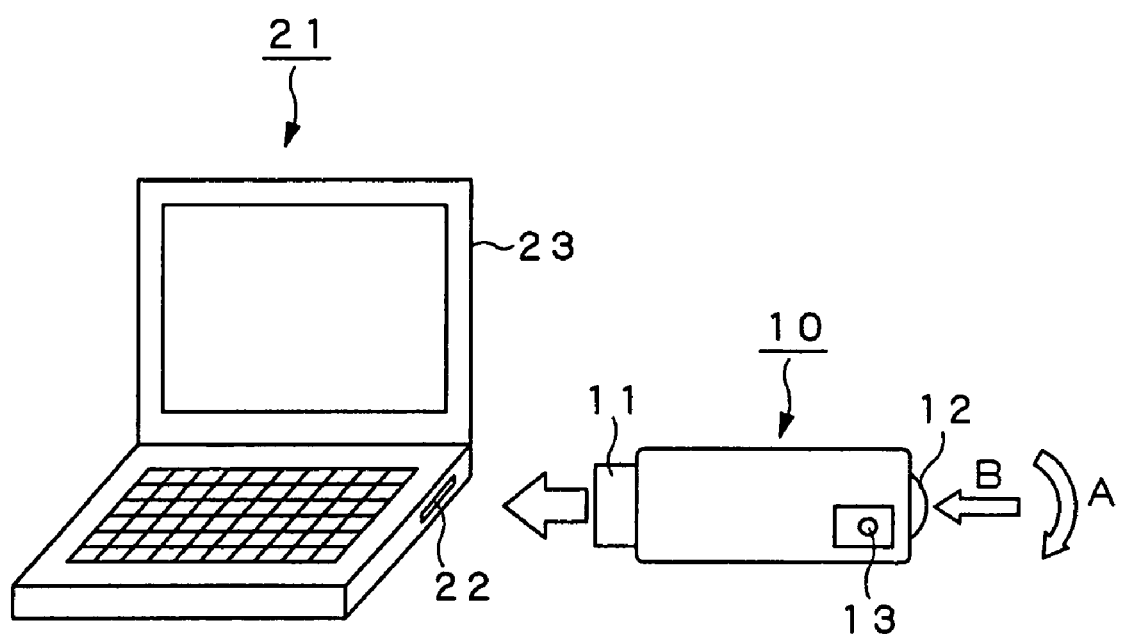
FIG. 1 is a schematic illustration of a mode of utilization of a storage medium as a first embodiment of the present invention.

FIG. 1 is a schematic illustration of a mode of utilization of a storage medium 10 as the first embodiment of a removable information storage device according to the present invention.

Referring to FIG. 1, the storage medium 10 becomes ready for use when a USB (Universal Serial Bus) plug 11 that the storage medium 10 has is inserted into a USB jack 22 that a PC (Personal Computer) 21, or external equipment, is provided with. Thus, the storage medium 10 operates as data storage, or external memory, of the PC 21 when it is directly connected to the PC 21, which is external equipment.

The PC 21 to which the storage medium 10 is connected operates under the control of a predetermined OS (Operating System). The PC 21 is equipped with a display unit 23 for displaying the outcome of a processing operation executed by the PC and so on. The display unit 23 is used to display candidates of a password when inputting a password for the storage medium 10 as will be described in greater detail hereinafter.

While the storage medium 10 is described as USB equipment that is connected to the PC 21, or external equipment, by way of a USB interface, the present invention is in no way limited to the use of such a connection interface and may be provided with any connection interface so long as it is connected to the PC 21.

As shown in FIG. 1, the storage medium 10 is provided with a jog dial 12 so that a user inputs a password for getting permission to access a flash memory, which will be described hereinafter, using the jog dial 12. The jog dial 12 is a mechanical input part that is adapted to be rotated in the direction of arrow A and depressed in the direction of arrow B. For example, the user drives the jog dial 12 to rotate in the direction of arrow A and select a desired character for a string of characters that constitutes a password and depresses the jog dial 12 in the direction of arrow B to finalize the selection of the character for a string of characters of a password.

However, the present invention is in no way limited to a specific type of password input part, or a jog dial 12 in the above-described instance, that is to be used for the storage medium 10. In other words, any input part may be used for the storage medium 10 so long as it can be mounted in the storage medium 10 and operated to select characters for a password and finalize the selection.

Additionally, as shown in FIG. 1, the storage medium 10 is also provided with an input validation lamp 13 for validating the password that is input by way of the jog dial 12. The input validation lamp 13 typically may be a light-emitting diode that emits red light. It is turned on when the jog dial 12 is depressed in the above-mentioned direction of arrow B as in the case of finalizing the selection of a component of a password.

Figure 2:
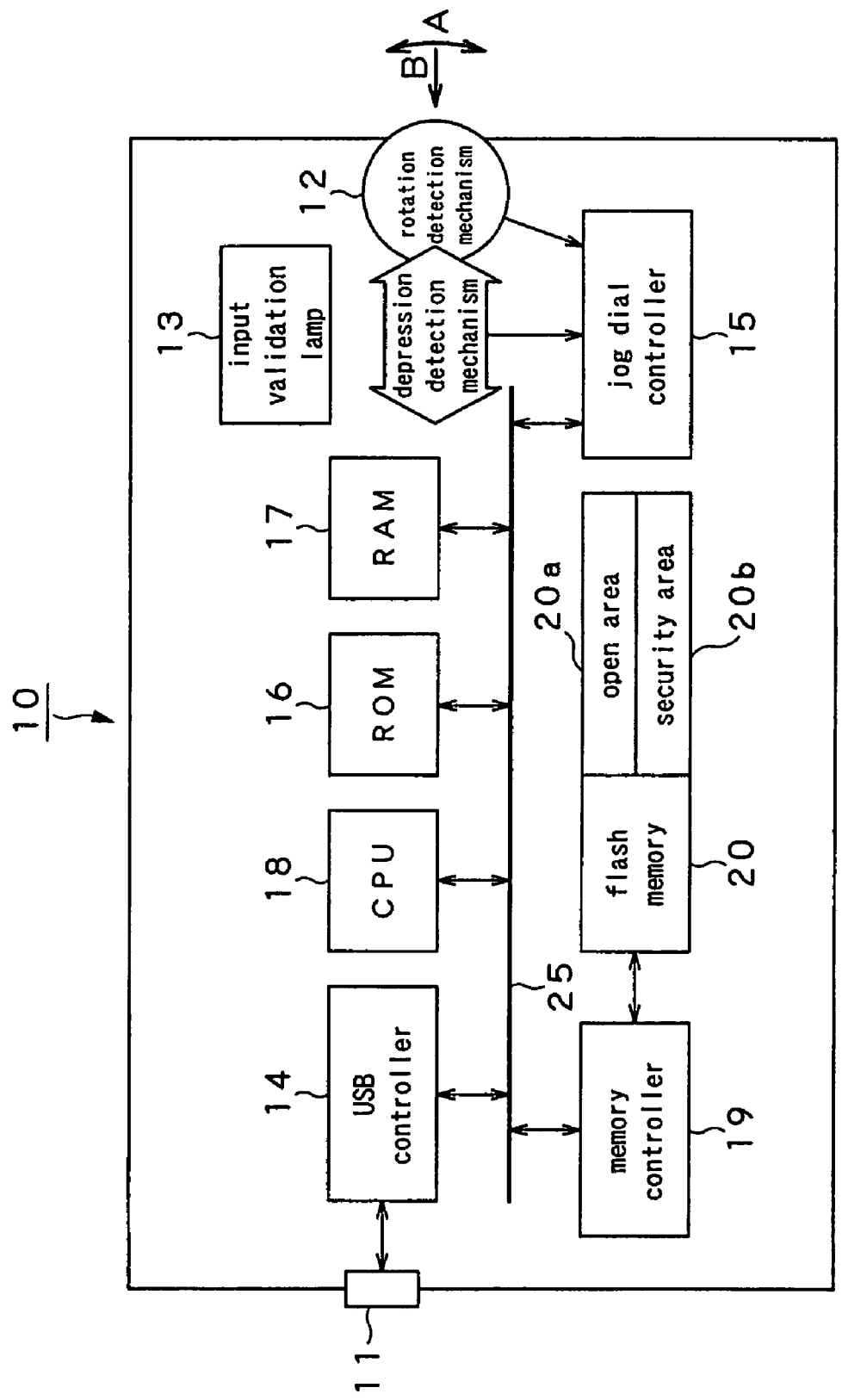
FIG. 2 is a schematic block diagram of the embodiment of the storage medium of FIG. 1.

Now, the configuration of the storage medium 10 will be described by referring to FIG. 2. The storage medium 10 includes a USB plug 11, a jog dial 12, an input validation lamp 13, a USB controller 14, a jog dial controller 15, a ROM (Read Only Memory) 16, a RAM (Random Access Memory) 17, a CPU (Central Processing Unit) 18, a memory controller 19 and a flash memory 20. The USB controller 14, the jog dial controller 15, the ROM 16, the RAM 17, the CPU 18 and the memory controller 19 are connected to each other by way of a bus 25.

As described above, the USB plug 11 is a USB interface for external equipment to be used for connecting itself, for instance, to a USB jack 22 of PC 21 as shown in FIG. 1. The storage medium 10 that is connected to the PC 21 by way of the USB plug 11 is driven to operate as power is supplied from the PC 21 typically for data communication with the PC 21.

As pointed out above, the jog dial 12 is a mechanical input part that is adapted to be rotated in the direction of arrow A and depressed in the direction of arrow B. The jog dial 12 is equipped with a rotation detection mechanism for detecting the sense of rotation and the rotary speed of the jog dial 12 that may change as the jog dial 12 is driven to rotate in the direction of arrow A and a depression detection mechanism for detecting a depressed motion of the jog dial 12 when it is depressed in the direction of arrow B. The rotation detection mechanism and the depression detection mechanism output the values they detect to the jog dial controller 15.

The input validation lamp 13 is typically a light-emitting diode that emits red light. It is turned on as a depressing operation signal is supplied to the jog dial controller 15 from the depression detection mechanism of the jog dial 12. Thus, the user can confirm that the password is properly input by seeing that the input validation lamp 13 is turned on.

The USB controller 14 controls the data transfer between the PC 21 and the storage medium 10 that is carried out by way of the USB plug 11 according to the USB protocol.

The jog dial controller 15 generates a rotary operation signal on the basis of the values of the sense of rotation and the rotary speed of the jog dial 12 as detected by the rotation detection mechanism of the jog dial 12. The jog dial controller 15 also generates a depressing operation signal on the basis of the value of the depression of the jog dial 12 as detected by the depression detection mechanism of the jog dial 12. The jog dial controller 15 then supplies the rotary operation signal and the depressing operation signal to the CPU 18.

Figure 3:
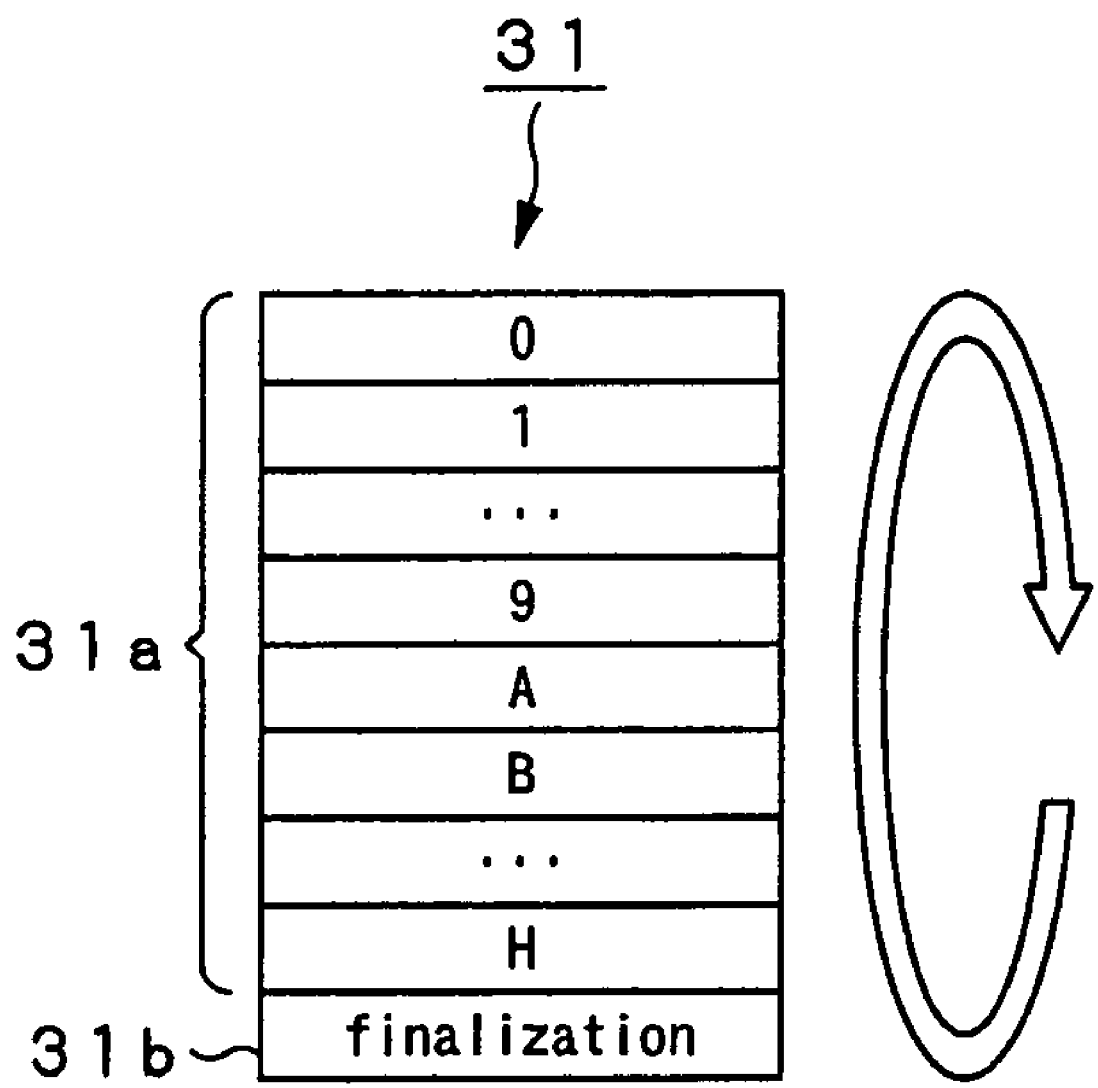
FIG. 3 is a schematic illustration of a password table stored in the first embodiment of the storage medium.

The ROM 16 is a memory that stores the firmware and the file system that are to be used by the CPU 18. The ROM 16 also stores a password table 31 as shown in FIG. 3. The password table 31 is a table that contains a character code group 31a of a number of character codes provided for the user to select a password by way of the jog dial 12 and a finalization code 31b provided for the user to finalize the password input by the user by way of the jog dial 12.

Thus, an appropriate character code of the character code group 31a or the finalization code 31b is read out from the password table 31 stored in the ROM 16 by the CPU 18 according to the rotary operation signal and the depressing operation signal supplied to the CPU 18 from the jog dial controller 15.

While the password table 31 is a table prepared on an assumption that the password registered by the user is a string of characters in the above description, the present invention is in no way limited to such a type of password.

For example, if the password registered by the user is prepared by arranging the names of the inhabitants of the residence where the user lives, the password table stored in the ROM 16 is a table that stores a number of codes, which are so many names.

If, on the other hand, the password registered by the user is prepared by arranging the denominations of the favorite drinks of the user, the password table stored in the ROM 16 is a table that stores a number of codes, which are so many denominations of drinks.

If, furthermore, the password registered by the user is prepared by arranging icons that can be recognized at a glance, or single icons, the password table stored in the ROM 16 is a table that stores a number of codes, which are so many icons.

The RAM 17 is a working memory with which the CPU 18 operates.

The CPU 18 comprehensively controls the operation of the storage medium 10 by using the firmware and the file system stored in the ROM 16. More specifically, the CPU 18 controls the memory controller 19 according to the file system so as to make the storage medium 10 operate as data storage by writing and storing the data transferred from the PC 21 by way of the USB plug 11 in the flash memory 20 or reading some of the data stored in the flash memory 20 and transferring it to the PC 21.

The CPU 18 reads out a character code typically from the password table 31 stored in the ROM 16 in response to the rotary operation signal supplied from the jog dial controller 15. The PC 21 that is connected to the storage medium 10 operates for polling, requesting periodic transmission of a character code to the CPU 18. In response to the polling by the PC 21, the CPU 18 transmits the character code it reads out to the PC 21 by way of the USB plug 11.

The character code transmitted to the PC 21 is displayed on the display unit 23 of the PC 21 by way of predetermined application software that is driven to operate by the PC 21. Thus, the user can confirm the character code he or she selects by operating the jog dial 12 him or herself by seeing the character being displayed on the display unit 23.

Additionally, the CPU 18 finalizes the character code read out from the password table 31 stored in the ROM 16 as a character of the string of characters of the password in response to the depressing operation signal supplied from the jog dial controller 15. The information that the character code read out by the CPU 18 is finalized as a character of the string of characters of the password in response to the depressing operation signal is not transmitted to the outside of the storage medium 10, or to the PC 21.

The memory controller 19 is controlled by the file system read out by the CPU 18 from the ROM 16. It controls the operation of writing data in the flash memory 20 and that of reading data stored in the flash memory 20, managing the data stored in the flash memory 20 as a file.

The flash memory 20 is a storage section of the storage medium 10 that is adapted to store the data managed as a file by the memory controller 19 under the control of the file system read out by the CPU 18 from the ROM 16. The memory region of the flash memory 20 includes an open area 20a that can be accessed from the PC 21 without any restriction and a security area 20b that can be accessed from the PC 21 only when the right password is input from the jog dial 12 after the storage medium 10 is connected to the PC 21.

As pointed out above, the security area 20b of the flash memory 20 can be accessed by the PC 21 only when the right password is input but it can be accessed at any time from the CPU 18 of the storage medium 10. For example, the security area 20b stores the password that is registered by the user by operating the jog dial 12 when the storage medium 10 is initialized. The CPU 18 compares the registered password that is stored in the security area 20b and the password input by the user by operating the jog dial 12 for collation to authenticate the password.

The open area 20a of the flash memory 20 stores the application software to be used for inputting the password (to be referred to as inputting application hereinafter) that is started when the user inputs the password by operating the jog dial 12 of the storage medium 10.

When the user uses the security area 20b after connecting the storage medium 10 to the PC 21, he or she firstly accesses the open area 20a and starts the inputting application. As pointed out above, the inputting application transforms the character code read out by the CPU 18 from the password table 30 of the ROM 16 into the character to be displayed on the display unit 23 of the PC 21 and outputs it to the display unit 23 so as actually to be displayed there. The user sees the character displayed on the display unit 23 by the inputting application started by the CPU 21 each time he or she operates the jog dial 12 of the storage medium 10 so that the user can confirm that the character he or she selects is the right one.

Figure 4:
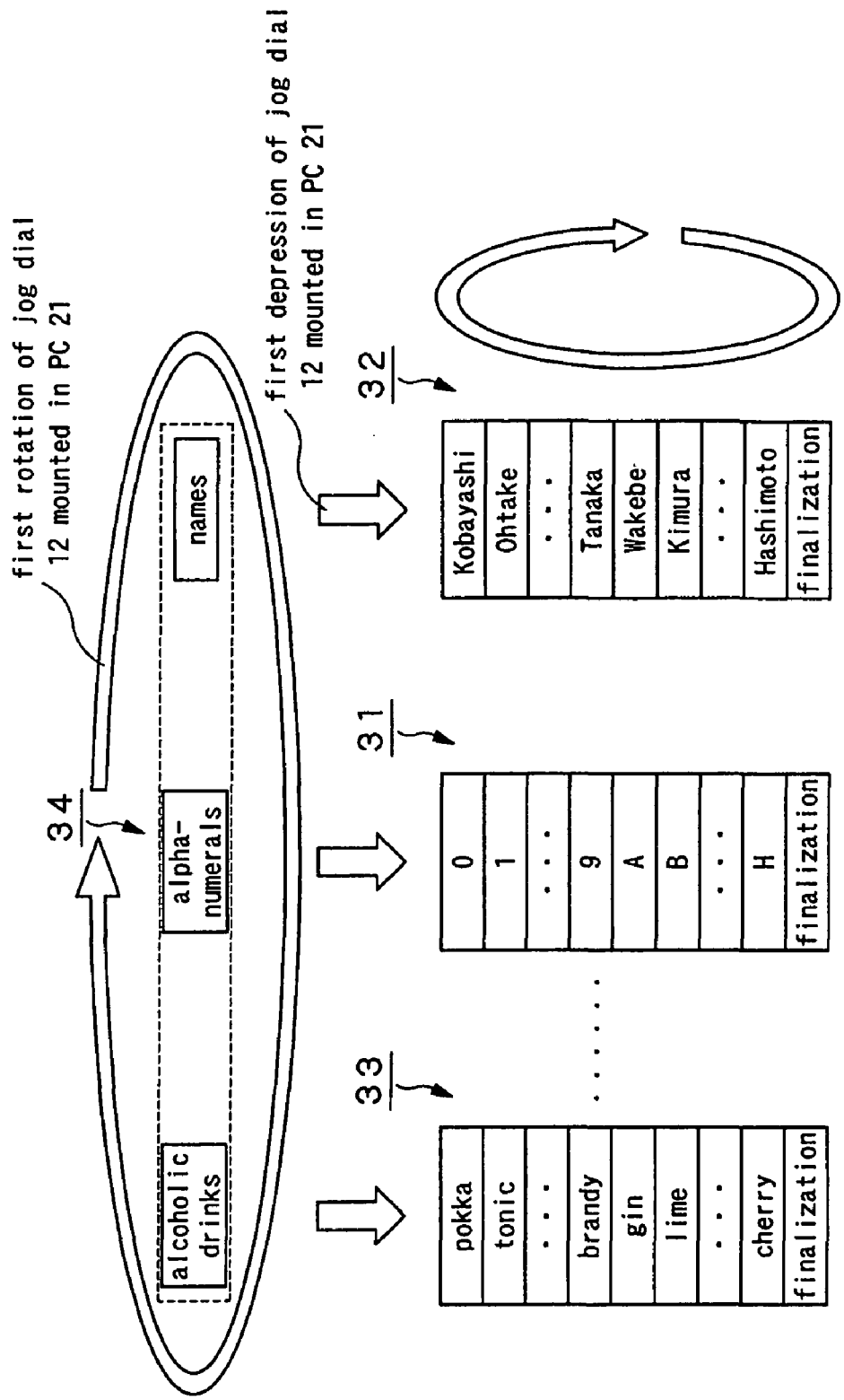
FIG. 4 is a schematic illustration of a number of password tables stored in the first embodiment of the storage medium and a specific method of using the password tables.

The ROM 16 may store a password table 31 containing a number of character codes, a password table 32 containing a number of names, a password table 33 containing a number of denominations of drinks and a category table 34 for selecting one of the password tables 31, 32, 33 as shown in FIG. 4 instead of storing a password table 30 containing a character code group 31a as shown in FIG. 3.

For example, when the user inserts the USB plug 11 of the storage medium 10 into the USB jack 22 of the PC 21 and subsequently operates the jog dial 12 to drive it to rotate for the first time, the category table 34 is read out by the CPU 18 and the user then selects one of the password tables 31, 32, 33 to input a password via a rotary operation signal. Similarly, when the user inserts the USB plug 11 of the storage medium 10 into the USB jack 22 of the PC 21 and subsequently operates the jog dial 12 to depress it for the first time, one of the password tables 31, 32, 33 is read out by the CPU 18 according to the depressing operation signal and the type of password to be input is determined.

Figure 5:
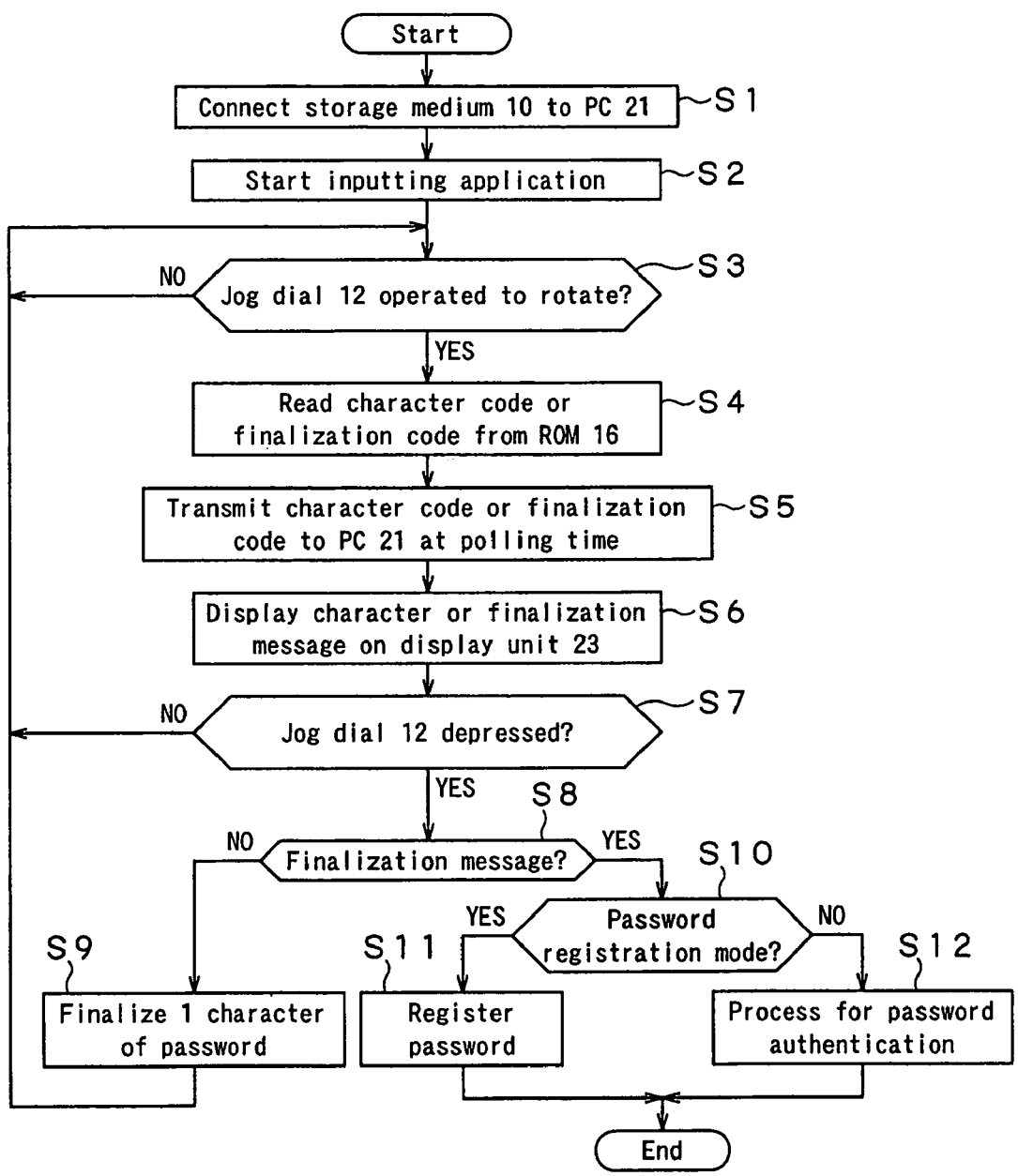
FIG. 5 is a flow chart of the password input operation of the first embodiment of the storage medium.

Now, the operation of inputting the password by using the jog dial 12 of the storage medium 10 will be described by referring to the flow chart of FIG. 5. It is assumed in the following description by referring to FIG. 5 that the password table 30 is stored in the ROM 16 and characters are used for the password.

Firstly, in Step S1, the USB plug 11 of the storage medium 10 is inserted into the USB jack 22 of the PC 21 to connect the storage medium 10 to the PC 21. As the storage medium 10 is connected to the PC 21, the OS of the PC 21 recognizes the storage medium 10 as peripheral equipment. Then, the storage medium 10 is indicated on a task bar 23a in the image being displayed on the display unit 23 and icon A indicating that the storage medium 10 is available is displayed in the image.

Figure 6:
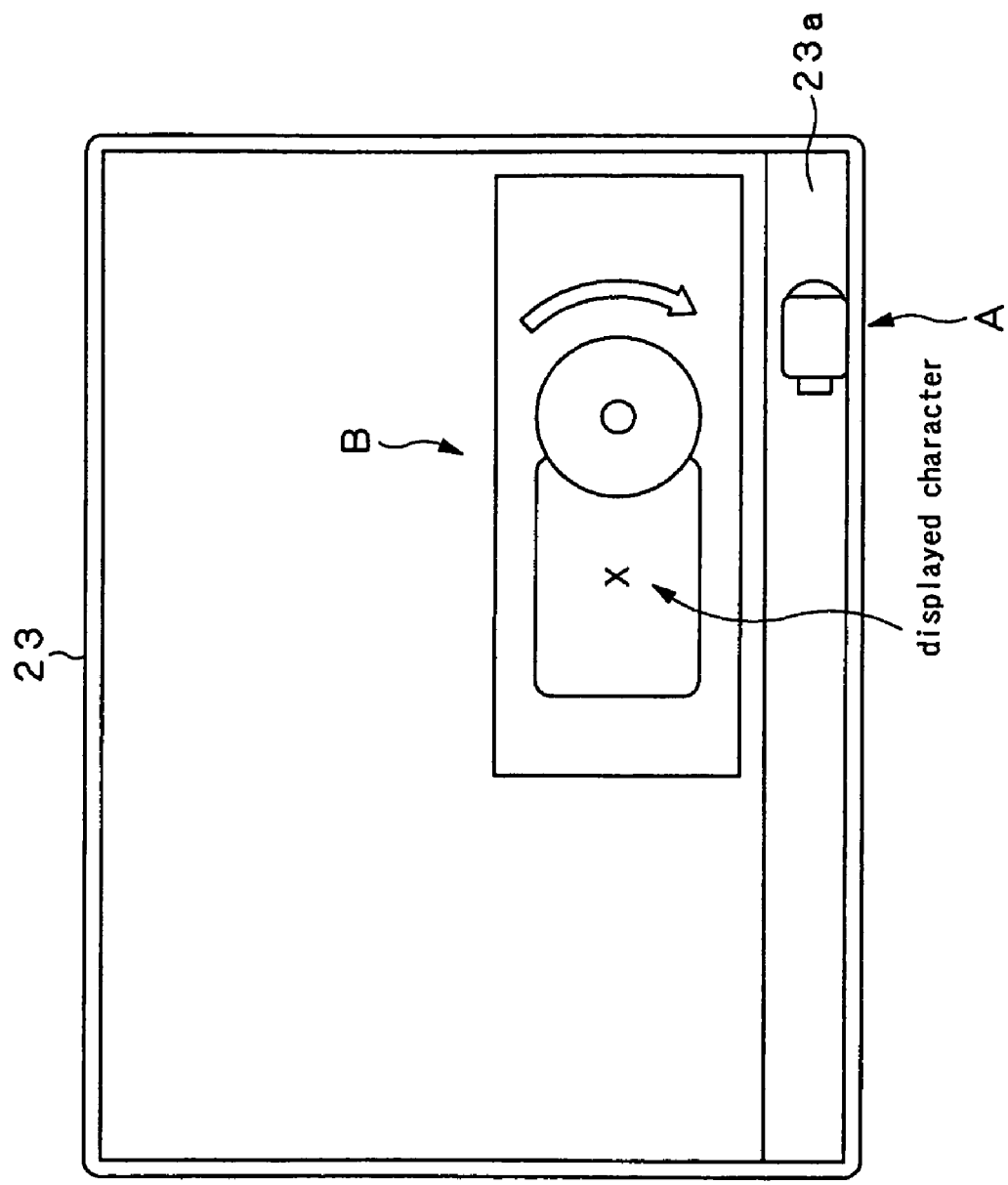
FIG. 6 is an exemplary mode of the application software for inputting a password for starting a PC (personal computer) connected to the first embodiment of the storage medium that is displayed when inputting the password to the storage medium.

Then, in Step S2, the user accesses the open area 20a of the flash memory 20 of the storage medium 10 by way of the PC 21 and starts the inputting application to operate. The OS of the PC 21 executes the inputting application and displays an inputting application execution image B as shown in FIG. 6. As the inputting application is executed, the storage medium 10 waits until the jog dial 12 is operated.

Then, in Step S3, the CPU 18 of the storage medium 10 determines if the jog dial 12 is operated to rotate according to the rotary operation signal supplied from the jog dial controller 15. Then, if the CPU 18 determines that the jog dial 12 is operated to rotate, it proceeds to Step S4. On the other hand, if the CPU 18 determines that the jog dial 12 is not operated to rotate, it keeps on waiting until the jog dial 12 is operated.

In Step S4, the CPU 18 reads a character code or finalization code from the password table 30 stored in the ROM 16 according to the rotary operation signal supplied from the jog dial controller 15.

If the CPU 18 is polled by the inputting application of the PC 21 for a request for transmission of a character code or the finalization code in Step S5, it transmits the character code or the finalization code it reads to the PC by way of the USB plug 11.

Then, in Step S6, the inputting application that is being executed by the PC 21 transforms the character code or the finalization code transmitted from the storage medium 10 into a character or a finalization message that can be displayed on the display unit 23 and displays it on the display unit 23. For example, the character code transmitted from the storage medium 10 is transformed and character "X" may be displayed in a predetermined region of the inputting application execution image B on the display unit 23 as shown in FIG. 6.

Then, in Step S7, the CPU 18 of the storage medium 10 determines if the jog dial 12 is depressed or not according to the depressing operation signal supplied from the jog dial controller 15. If the CPU 18 determines that the jog dial 12 is depressed, it proceeds to Step S8. On the other hand, if the CPU 18 determines that the jog dial 12 is not depressed, it returns to Step S3 and keeps on waiting until the jog dial 12 is operated.

Then, in Step S8, if the finalization code is read by the CPU 18 from the password table 30 of the ROM 16 and hence it is being displayed on the display unit 23, the CPU 18 determines if the jog dial 12 is depressed and a depressing operation signal is supplied to it from the jog dial controller 15 or not. If the CPU 18 determines that the jog dial 12 is depressed not for the finalization message but for the character being displayed on the display unit 23, it proceeds to Step S9. If, on the other hand, the CPU 18 determines that the jog dial 12 is depressed for the finalization message, it proceeds to Step S10.

In Step S9, the CPU 18 finalizes the character in the string of characters of the password in response to the operation of depressing the jog dial 12 for the character being displayed on the display unit 23 and the depressing operation signal supplied from the jog dial controller 15. As the operation of Step S9 is terminated, the CPU 18 returns to Step S3 and once again keeps on waiting unit the jog dial 12 is operated.

In Step S11, if the CPU 18 finds that the password is not registered in the security area 20b of the flash memory 20 after that the jog dial 12 is depressed for the character being displayed on the display unit 23 and a depressing operation signal is supplied from the jog dial controller 15, it proceeds to Step S11 to select a password registration mode. If, on the other hand, the CPU 18 finds that the password has already been registered in the security area 20b of the flash memory 20, it proceeds to Step S12 to select a password authentication mode.

In Step S11, the CPU 18 controls the memory controller 19 and stores the password formed by a string of a number of characters and input by way of the jog dial 12 in the security area 20b of the flash memory 20.

In Step S12, the CPU 18 controls the memory controller 19 and accesses the security area 20b of the flash memory 20 to read the registered password that is stored there. Then, the CPU 18 compares the registered and read out password and the password newly input from the jog dial 12 for collation and operates for authentication.

When the input password matches the registered password and is authenticated, the CPU 18 releases the security area 20b of the flash memory 20 to permit the access from the PC 21 by way of the USB plug 11.

As described above, when a password is input, the storage medium 10 connected to the PC 21 transmits each character code for selecting the password by driving the jog dial 12 to rotate to the PC 21 but it transmits the depressing operation signal for notifying which character code is determined to select the password only to the CPU 18. Therefore, it is not possible to know the input password by way of the PC 21. Additionally, since it is not possible to input a password from the PC 21, any unauthorized access from the PC 21 is prevented from taking place.

In other words, the storage medium 10 utilizes the display unit 23 of the PC 21 only to allow the user to see and confirm the input password so that, unlike any conventional technique, the password that is directly input to the PC 21 does not remain in the PC 21. Thus, according to the present invention, the password is completely protected against any risk of being leaked.

Although not shown, a small liquid crystal display unit may be mounted on the storage medium 10 so that the storage medium 10 may take the role of displaying a character or the finalization message in a password input operation that is taken by the display unit 23 of the PC 21 of the above description. In this case, manufacturing cost of the storage medium 10 increases for the liquid crystal display unit; however, the storage medium 10 itself can configure the completely independent security system.

2nd Embodiment

Now, the second embodiment of the present invention will be described. The second embodiment is used as one-time password generator for generating a one-time password of the storage medium 10. A one-time password is a password that is used to authenticate that the user accessing from a terminal device is an authorized user. Since a different one-time password is used each time the user accesses the network, it provides an advantage that it is not accompanied by the risk of being surreptitiously glanced or eavesdropped. Since the user inputs a one-time password that is different from any preceding ones, it is a general practice that a one-time password generator adapted to automatically generate a one-time password is used for the purpose of convenience on the part of the user.

Figure 7:
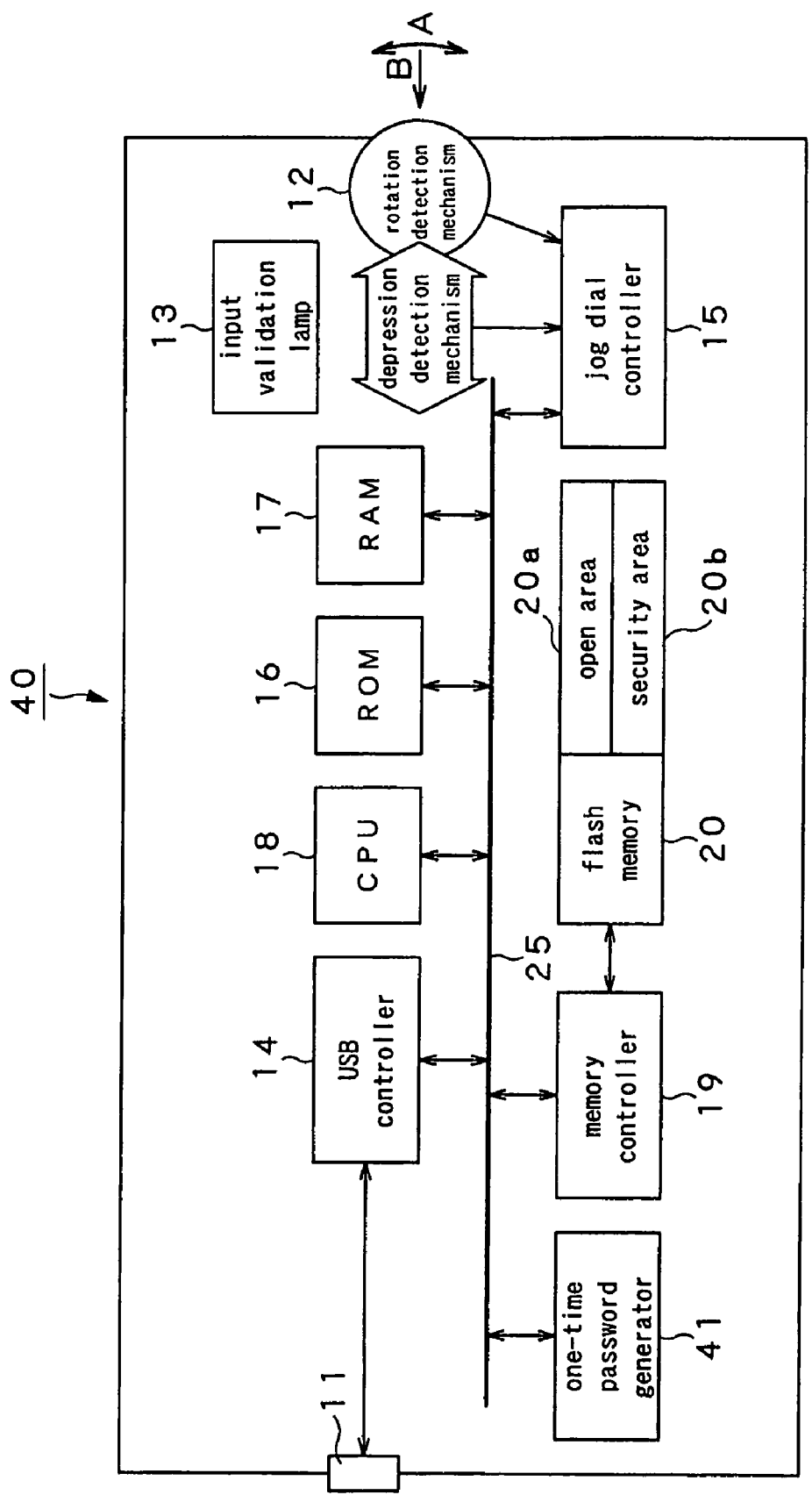
FIG. 7 is a schematic block diagram of a storage medium as a second embodiment of the present invention.

FIG. 7 is a schematic block diagram of a storage medium 40 that is equipped with a one-time password generator. The storage medium 40 is identical with the storage medium 10 described above by referring to FIG. 2 except that it additionally includes a one-time password generator 41 and hence the same components as those of the storage medium 10 are denoted respectively by the same reference symbols and will not be described any further.

The one-time password generator 41 generates a one-time password each time the user accesses the network according to a predetermined algorithm defined between it and the authentication server (RADIUS server) on the network.

The flash memory 20 of the storage medium 40 stores an encryption key Uk in the security area 20b thereof. The encryption key Uk becomes available when the password is input via of the jog dial 12 to make the security area 20b accessible. The encryption key Uk in the security area 20b is stored there by the manufacturer at the time of manufacturing the storage medium 40 so as to be used at the time of a challenge-response operation in the authentication process using a one-time password.

Figure 8:
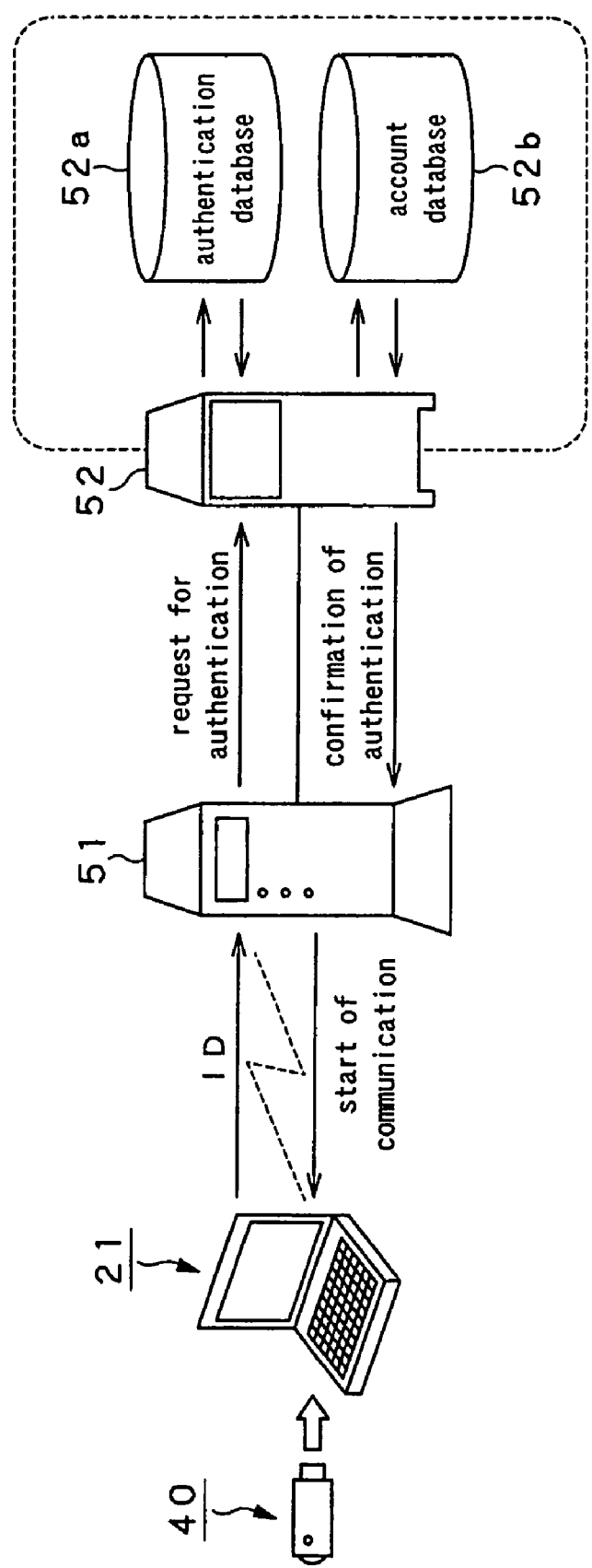
FIG. 8 is a schematic illustration of a mode of utilization of the second embodiment of the storage medium.

More specifically, the storage medium 40 that includes the one-time password generator 41 can be used with an authentication system, or so-called RADIUS (Remote Authentication Dial In User Service) authentication system as shown in FIG. 8. A RADIUS authentication system is a client-server type authentication system that can find advantageous applications in network systems that have a large number of remote access points and in which user information is centrally managed.

Referring to FIG. 8, in a RADIUS authentication system, the PC 21 that operates as a client terminal firstly dials a remote access server 51. Then, the remote access server 51 requests authentication to the RADIUS server 52 and the RADIUS server 52, in turn, transmits a message telling that either it can or it cannot authenticate to the PC 21 that is the client terminal. The RADIUS server 52 includes an authentication database 52a storing authentication information on the registered users to be used for authentication processes and an account database 52b to be used for a billing process when providing a network service depending on the outcome of each authentication process.

A RADIUS authentication system as described above typically can find applications in the fields of music delivery services, software delivery services and electronic commerce.

Now, the authentication process of the RADIUS authentication system will be described by referring to the flow chart of FIG. 9.

Firstly, in Step S21, a password is input from the storage medium 40 in a manner exactly the same as described above by referring to the flow chart of FIG. 5. As the password is authenticated, it is possible to access the security area 20a of the flash memory 20 and use the encryption key Uk.

Figure 10:
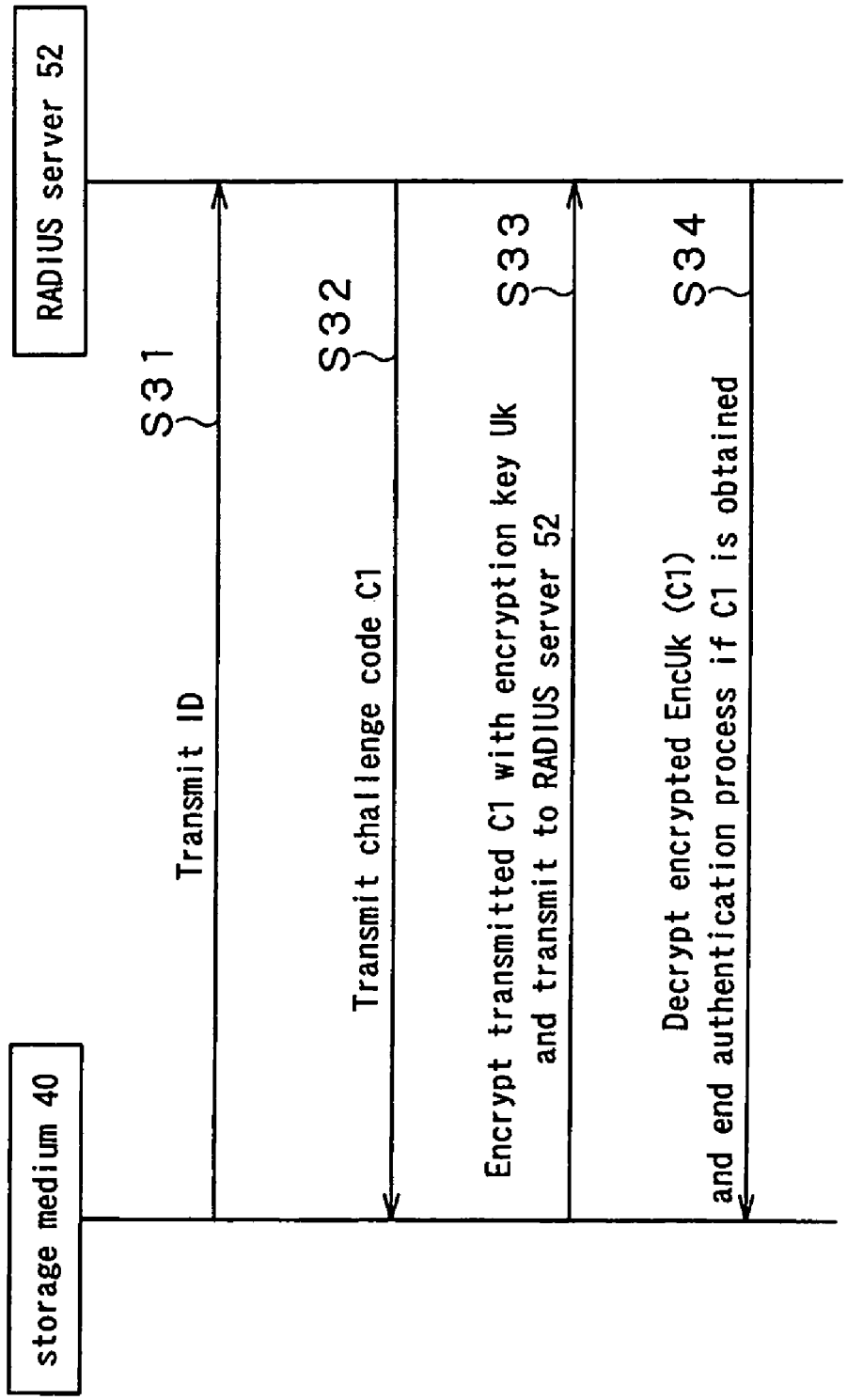
FIG. 10 is a timing chart of a challenge-response operation in the user authentication process illustrated in the flow chart of FIG. 9.

Then, in Step S22, in response to that the password is authenticated to make it possible to access the security area 20a of the flash memory 20, a challenge-response operation is started as illustrated in the timing chart of FIG. 10. While the timing chart of FIG. 10 is only for the storage medium 40 and the RADIUS server 52 for the purpose of simplicity of description, it works only on the assumption that the storage medium 40 is connected to the PC 21 and also to the RADIUS server 52 on the network by way of the remote access server 51 as shown in FIG. 8.

Referring to FIG. 10, in Step S31, firstly the user transmits his or her own ID that is registered in advance from the storage medium 40 to the RADIUS server 52. The technique that is used to input the ID is the same as the one described above for inputting a password via the jog dial 12.

Upon receiving the ID, the RADIUS server 52 transmits challenge code C1 to the storage medium 40 in Step S32. Thus, the RADIUS server 52 transmits a challenge code that is different from any preceding ones each time an ID is transmitted from the storage medium 40. The challenge code typically may be a random number.

In Step S33, the CPU 18 of the storage medium 40 reads out the encryption key Uk from the security area 20b of the flash memory 20 that is now accessible and supplies the read out encryption key Uk to the one-time password generator 41.

Then, the one-time password generator 41 encrypts the challenge code C1 transmitted from the RADIUS server 52 according to a predetermined algorithm, using the encryption key Uk. The challenge code C1 that is encrypted by the one-time password generator 41 by using the encryption key Uk will be referred to as EncUk (C1) hereinafter. The storage medium 40 transmits the EncUk (C1) to the RADIUS server 52.

Then, in Step S34, the RADIUS server 52 decrypts the transmitted EncUk (C1). If the challenge code C1 is obtained as a result of the decryption, the user who inputs his or her ID to the storage medium 40 and transmits it to the RADIUS server 52 is authenticated as authorized user.

Figure 9:
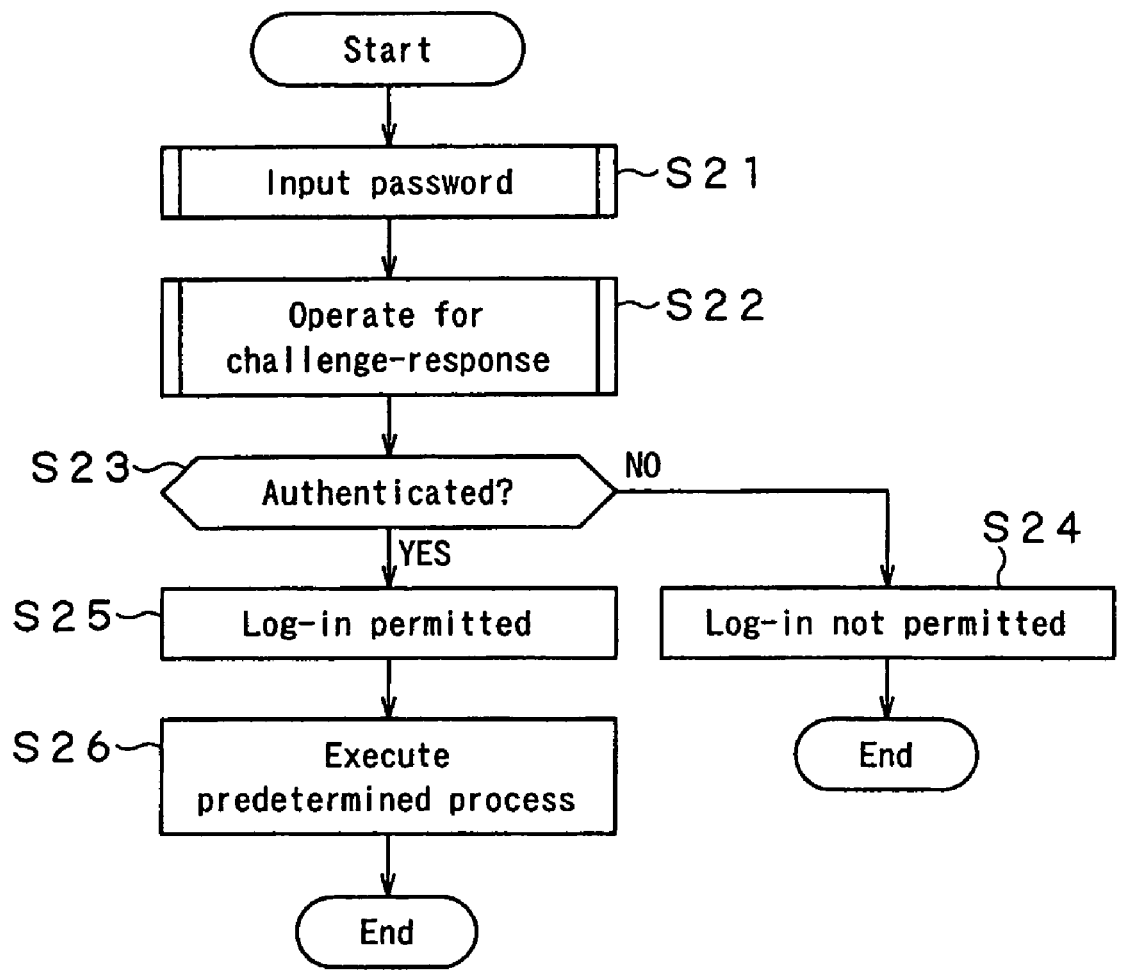
FIG. 9 is a flow chart of the operation of generating a one-time password for a user authentication process, using the second embodiment of the storage medium.

Now, the operation returns to the flow chart of FIG. 9.

In Step S23, if the user is not authenticated as a result of the challenge-response operation in the above-described Step S22, the processing operation proceeds to Step S24. If, on the other hand, the user is authenticated as a result of the challenge-response operation in Step S22, the processing operation proceeds to Step S25.

In Step S24, any attempt for logging in the RADIUS authentication system fails and the user cannot receive any of various application services provided by the RADIUS server 52 because the user is not authenticated.

In Step S25, it is possible to log in the RADIUS authentication system because the user is authenticated.

In Step S26, the user actually receives any of various application services provided by the RADIUS server 52.

In this way, the storage medium 40 that is provided with the one-time password generator 41 can use a very strong authentication process that involves the use of one-time passwords in a RADIUS authentication system so that it is possible to practically eliminate the risk of being surreptitiously glanced or eavesdropped. Additionally, as in the case of the storage medium 10, the password that is directly input to the PC 21 connected to the storage medium 40 does not remain in the PC 21.

3rd Embodiment

Now, a technique of using a storage medium 10 connected to a PC 21 whose security feature is improved by mounting a security chip defined by the TCG (Trusted Computing Group) will be described below.

The security chip is formally called a TPM (Trusted Platform Module) and is designed to provide a basic function for safeguarding security and privacy. It is defined in the specification that specifies the above-described TCG. The security chip that is mounted on a PC cannot be moved to any other PC and, when the security chip is removed, it is no longer possible to start the PC.

Figure 11:
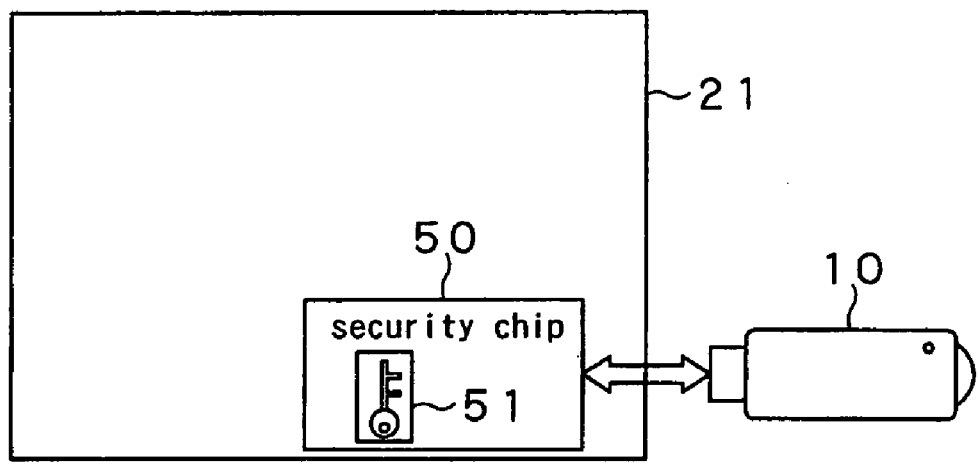

FIG. 11 illustrates a PC 21 on which a security chip 50 is mounted. The security chip 50 typically includes a memory 51, which may be an EEPROM (Electrically Erasable Programmable Read Only Memory). The memory 51 stores an encryption key Ck that operates as a core key for the security process to be carried out in the PC 21 in which the security chip 50 is mounted. Since the encryption key Ck stored in the memory 51 is contained in the security chip 50, it can hardly be a prey of fraudulent access. Additionally, since there is no command for directly reading it from the security chip 50, it will not be read out fraudulently.

The encryption key Ck encrypts the encryption key to be used for utilizing any application software in the PC 21. Therefore, the encryption key Ck is required whenever such application software is utilized. Thus, the PC 21 equipped with the security chip 50 can provide a security feature that cannot be used outside the PC 21 because it operates for authentication of the user, encryption of files and protection of electronic certificates, using the encryption key Ck stored in the memory 51 of the security chip 50.

A PC 21 equipped with a security chip 50 also requires user authentication in order to eliminate fraudulent users trying to access the storage medium 10. As pointed out above, the password left in the PC 21 can be fraudulently acquired if a password is input from the PC 21 typically via the keyboard. Therefore, the password is input via the storage medium 10.

Figure 12:
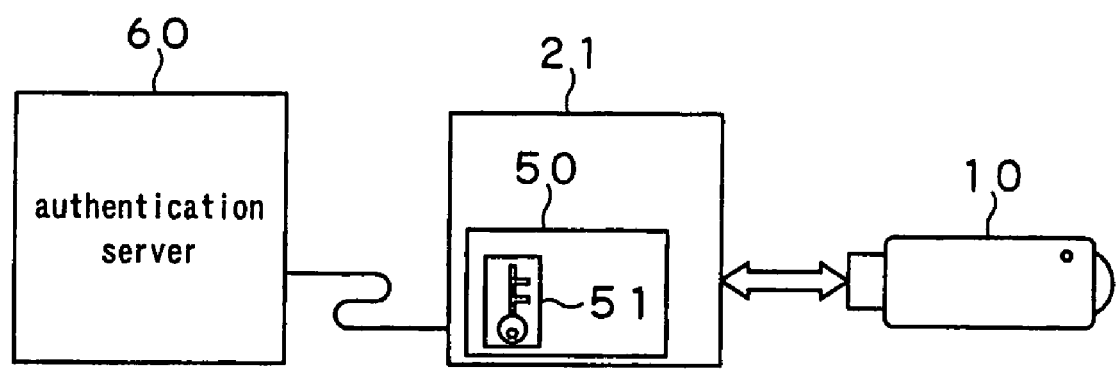
FIG. 12 is a schematic illustration of a mode of utilization of the third embodiment of the storage medium.

An encryption key that is totally identical with the encryption key Ck stored in the memory 51 of the security chip 50 of the PC 21 is stored in the security area 20b of the flash memory 20 of the storage medium 10. Thus, the user is authenticated by way of a challenge-response operation that is conducted between the storage medium 10 and the authentication server 60 connected to the PC 21 through a network as shown in FIG. 12 by using the encryption key Ck.

Now, the authentication process of the user authentication system will be described by referring to the flow chart of FIG. 13.

Firstly, in Step S41, a password is input from the storage medium 10 in a manner exactly the same as described above by referring to the flow chart of FIG. 5. As the password is authenticated, it is possible to access the security area 20a of the flash memory 20 and use the encryption key Ck.

Figure 14:
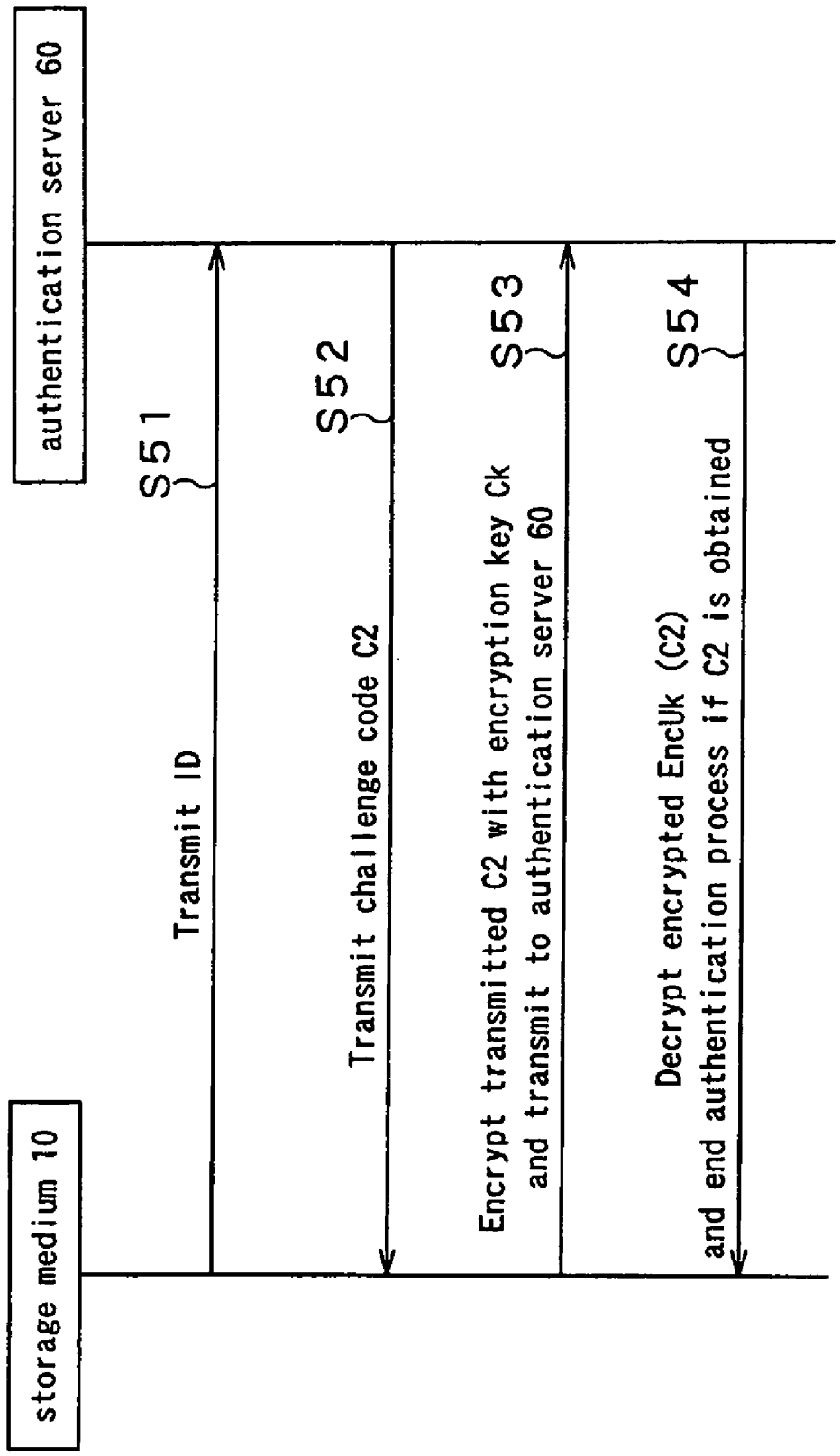
FIG. 14 is a timing chart of a challenge-response operation in the user authentication process illustrated in the flow chart of FIG. 13.

Then, in Step S42, in response to that the password is authenticated to make it possible to access the security area 20a of the flash memory 20, a challenge-response operation is started as illustrated in the timing chart of FIG. 14. While the timing chart of FIG. 14 is only for the storage medium 10 and the authentication server 60 for the purpose of simplicity of description, it works only on the assumption that the storage medium 10 is connected to the PC 21 and also to the authentication server 60 on the network as shown in FIG. 12.

Referring to FIG. 14, in Step S51, firstly the user transmits his or her own ID that is registered in advance from the storage medium 10 to the authentication server 60. The technique that is used to input the ID is the same as the one described above for inputting a password via the jog dial 12.

Upon receiving the ID, the authentication server 60 transmits challenge code C2 to the storage medium 10 in Step S52. Thus, the authentication server 60 transmits a challenge code that is different from any preceding ones each time an ID is transmitted from the storage medium 10. The challenge code typically may be a random number.

In Step S53, the CPU 18 of the storage medium 10 reads out the encryption key Ck from the security area 20b of the flash memory 20 that is now accessible.

Then, the CPU 18 encrypts the challenge code C2 transmitted from the authentication server 60 according to a predetermined algorithm, using the encryption key Ck. The challenge code C2 that is encrypted by using the encryption key Ck will be referred to as EncCk (C2) hereinafter. The storage medium 10 transmits the EncCk (C2) to the authentication server 60.

Then, in Step S54, the authentication server 60 decrypts the transmitted EncCk (C2). If the challenge code C2 is obtained as a result of the decryption, the user who inputs his or her ID to the storage medium 10 and transmits it to the authentication server 60 is authenticated as authorized user.

Figure 13:
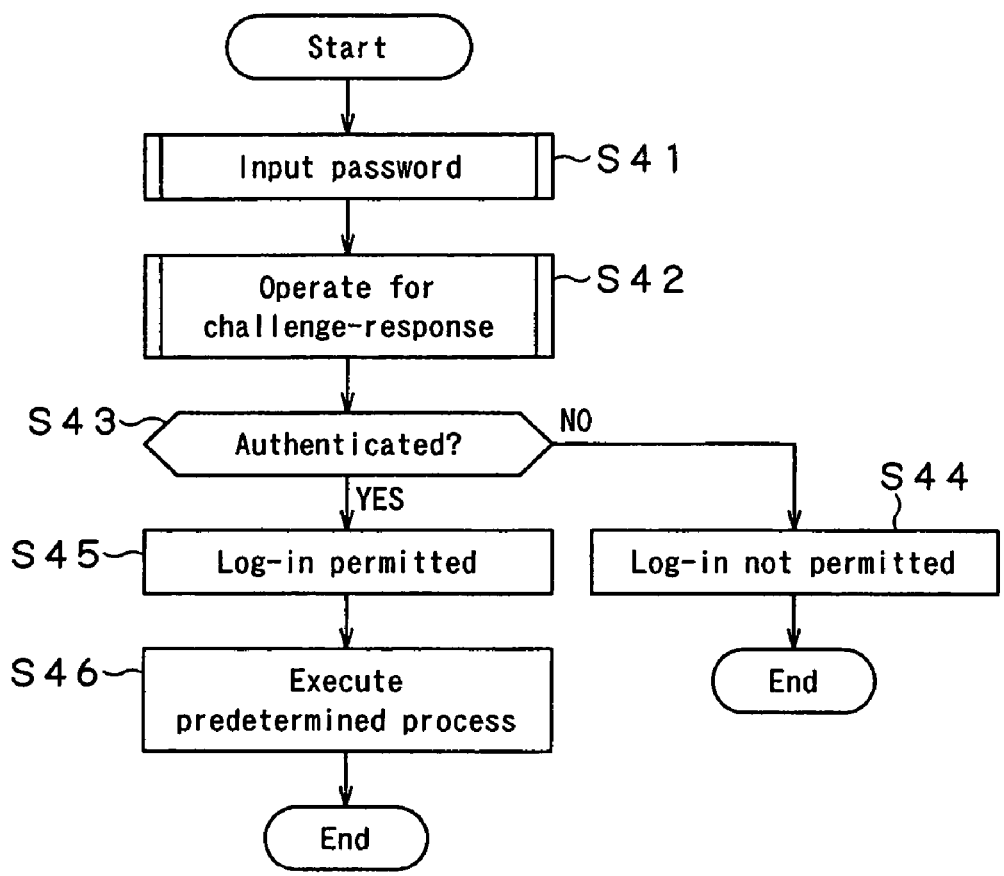
FIG. 13 is a flow chart of the operation of a user authentication process, using the third embodiment of the storage medium.

Now, the operation returns to the flow chart of FIG. 13.

In Step S43, if the user is not authenticated as a result of the challenge-response operation in the above-described Step S42, the processing operation proceeds to Step S44. If, on the other hand, the user is authenticated as a result of the challenge-response operation in Step S42, the processing operation proceeds to Step S45.

In Step S44, any attempt for logging in for executing any of various application services that are provided by the system and accompany a security process using the security chip 50 in the PC 21 fails because the user is not authenticated.

In Step S45, it is possible to log in for executing any various application services that are provided by the system and accompany a security process using the security chip 50 in the PC 21 because the user is authenticated.

In Step S46, the user actually receives any of various application services provided by the system and accompany a security process using the security chip 50 in the PC 21.

In this way, the user is authenticated via the encryption key Ck stored in the security area 20b of the flash memory 20 that becomes available when the password input via the jog dial 12 of the storage medium 10 is collated and validated so that it is possible to realize a very strong authentication process. Additionally, it is possible to practically eliminate the risk of being surreptitiously glanced or eavesdropped and prevent the password from remaining in the PC 21.

The storage mediums 10, 40 of the above-described first through third embodiments may be equipped with a biometric feature such as finger print collation/identification in order to authenticate the user via the biometric feature.

The invention claimed is:

1. An information storage device comprising:
   a predetermined interface configured to removably connect to an external equipment having a display device;
   a storage area configured to restrict access from the external equipment, the storage area having a password stored therein, the password being comprised of a string of characters;
   an input device;
   at least one processor; and
   at least one memory device storing instructions which when executed by the at least one processor, cause the at least one processor to operate with the interface, the storage area and the input device to:
   (a) enable a user to input the characters of the string of characters of the password using the input device, the characters and the password being notified to the information storage device without communicating the characters and the password to the external equipment;
   (b) in response to a first operation of the input device, select a character from a plurality of characters;
   (c) cause the display device of the external apparatus to display the selected character;
   (d) in response to a second operation of the input device, finalize the displayed character as one of the characters in the string of characters of the password, the second operation of the input device which finalizes the displayed character as one of the characters in the string of characters of the password being unknown to the external equipment;
   (e) in response to an operation of the input device which indicates a finalization of the input of the characters in the string of characters of the password, determine whether the characters input in association with the operation of the input device correspond to the characters in the string of characters of the password stored in the storage area of the storage device, the operation of the input device which indicates a finalization of the input of the characters in the string of characters of the password being distinct from the first operation of the input device and the second operation of the input device; and
   (f) in response to the characters that were input in association with the operation of the input device corresponding to the characters in the string of characters of the password stored in the storage area of the storage device, permit the external equipment an access to the storage area by way of the predetermined interface.

2. The information storage device of claim 1, wherein:
   (a) the storage area comprises:
      (i) a first storage region configured to always permit access from the external equipment connected to it by way of the predetermined interface; and
      (ii) a second storage region configured to restrict access from the external equipment connected to it by way of the predetermined interface; and
   (b) when executed by the at least one processor, the instructions cause the processor to permit an access to the second storage region in response to the characters that were input in association with the operation of the input device corresponding to the characters in the string of characters of the password stored in the storage area of the storage device.

3. The information storage device of claim 1, wherein the plurality of characters are stored in a password table in the information storage device.

4. The information storage device of claim 3, wherein:
   (a) when executed by the at least one processor, the instructions cause the at least one processor to control an output of the selected character to the external equipment connected to the information storage device by way of the predetermined interface; and
   (b) the first storage region of the storage area stores application software for visually displaying the output of the selected character to the external equipment on the display device when started by the external equipment.

5. A method of operating a removable information storage device having: (i) a predetermined interface configured to removably connect to an external equipment having a display device; and (ii) a storage area configured to restrict access from the external equipment, the storage area having a password stored therein, the password being comprised of a string of characters; and (iii) instructions, the method comprising:
   (a) enabling a user to input the characters of the string of characters of the password using the input device, the characters and the password being notified to the information storage device without communicating the characters and the password to the external equipment;
   (b) causing the at least one processor to execute the instructions to, in response to a first operation of the input device, select a character from a plurality of characters;
   (c) causing the display device of the external, apparatus to display the selected character;
   (d) causing the at least one processor to execute the instructions to, in response to a second operation of the input device, finalize the displayed character as one of the characters in the string of characters of selected code as the password, the second operation of the input device which finalizes the displayed character as one of the characters in the string of characters of wherein the password being unknown to the external equipment;
   (e) causing the at least one processor to execute the instructions to, in response to an operation of the input device which indicates a finalization of the input of the characters in the string of characters of the password, determine whether the characters input in association with the operation of the input device correspond to the characters in the string of characters of the password stored in the storage area of the storage device; and
   (f) causing the at least one processor to execute the instructions to, in response to the characters that were input in association with the operation of the input device corresponding to the characters in the string of characters of the password stored in the storage area of the storage device, permit the external equipment an access to the storage area by way of the predetermined interface.

6. A security system comprising:

a server device;

a terminal device having a display device, the terminal device being connected to the server device by way of a network; and a removable information storage device having a predetermined interface configured to removably connect to the terminal device;

the removable information storage device comprising:
- (a) a one time password generator;
- (b) a storage area configured to:
  - (i) store an encryption key for encrypting predetermined data;
  - (ii) store a user password which is comprised of a string of characters; and
  - (iii) restrict access from the terminal device;
- (c) an input device;
- (d) a first processor; and
- (e) a first memory device storing instructions which when executed by the first processor, cause the first processor to operate with the interface, the storage area and the input device to:
  - (i) enable a user to input the characters in the string of characters of the user password using the input device, the characters and the user password being notified to the information storage device without communicating the characters and the user password to the terminal device connected to the information storage device;
  - (ii) in response to a first operation of the input device, select a character from a plurality of characters;
  - (iii) cause the display device of the terminal device to display the selected character;
  - (iv) in response to a second operation of the input device, finalize the displayed character as one of the characters in the string of characters of the user password, the second operation of the input device which finalizes the displayed character as one of the characters in the string of characters of the user password being unknown to the external equipment;
  - (v) in response to an operation of the input device which indicates a finalization of the input of the characters in the string of characters of the user password, determine whether the characters that were input in association with the operation of the input device correspond to the characters in the string of characters of the user password that is stored in the storage area of the storage device; and
  - (vi) in response to the characters input in association with the operation of the input device corresponding to the characters in the string of characters of the user password that is stored in the storage area of the storage device:
    - (A) permit the terminal device an access to the storage area by way of the predetermined interface;
    - (B) generate a one-time authentication password different from any preceding authentication passwords according to a predetermined algorithm using the encryption key stored in the storage area and a challenge code which is transmitted from the server device in response to an access request made by the terminal device to the server device; and
    - (C) control an operation of transmitting the one-time authentication password by way of the terminal device connected to the network; and the server device comprising:
- (a) a second processor; and
- (b) a second memory device storing instructions which when executed by the second processor, cause the second processor to:
  - (i) verify the transmitted one-time authentication password; and
  - (ii) authenticate a user requesting an access from the terminal device connected by way of the network according to an outcome of the verification.

7. The security system of claim 6, wherein:
- (a) the storage area of the information storage device comprises:
  - (i) a first storage region configured to always permit access from the terminal device connected to it by way of the predetermined interface; and
  - (ii) a second storage region configured to restrict access from the terminal device connected to it by way of the predetermined interface; and
- (b) when executed by the first processor, the instructions cause the first processor to permit an access to the second storage region in response to the characters that were input in association with the operation of the input device corresponding to the characters in the string of characters of the user password stored in the storage area of the storage device.

8. The security system of claim 6, wherein the plurality of characters are stored in a password table in the information storage device.

9. The security system of claim 8, wherein:
- (a) when executed by the first processor, the instructions cause the first processor to control an output of the selected character to the terminal device connected to the information storage device by way of the predetermined interface; and
- (b) the first storage region of the storage area stores application software for visually displaying the output of the selected character to the terminal device on the display device when started by the terminal device.

10. A method of operating a security system including instructions, the security system comprising: (a) a server device; (b) a terminal device having a display device, the terminal device being connected to the server device by way of a network; and (c) a removable information storage device having a predetermined interface configured to removably connect to the terminal device and storing a user password therein, the user password being comprised of a string of characters, the method comprising:
- (a) enabling a user to input the characters in the string of characters of the user password using an input device, the characters and the user password being notified to the information storage device without communicating the characters and the user password to the terminal device connected to the information storage device;
- (b) causing at least one processor to execute the instructions to, in response to a first operation of the input device, select a character from a plurality of characters;
- (c) causing the display device of the terminal device to display the selected character;
- (d) causing the at least one processor to execute the instructions to, in response to a second operation of the input device, finalize the displayed character as one of the characters in the string of characters of the user password, the second operation of the input device which finalizes the displayed character as one of the characters in the string of characters of the user password being unknown to the external equipment;

(e) causing the at least one processor to execute the instructions to, in response to an operation of the input device which indicates a finalization of the input of the characters in the string of characters of the user password, determine whether the characters that were input in association with the operation of the input device correspond to the characters in the string of characters of the user password that is stored in the storage area of the storage device;

(f) causing the at least one processor to execute the instructions to, in response to the characters input in association with the operation of the input device corresponding to the characters in the string of characters of the user password that is stored in the storage area of the storage device
  (1) permit the terminal apparatus an access to a storage area of the information storage device by way of the predetermined interface;
  (2) generate a one-time authentication password which is different from any preceding authentication passwords according to a predetermined algorithm using an encryption key stored in the storage area and a challenge code transmitted from the server device in response to an access request made by the terminal device to the server device; and
  (3) control an operation of transmitting the one-time authentication password;

(g) causing the second processor to execute the instructions to verify the transmitted one-time authentication password;

(h) causing the second processor to execute the instructions to authenticate a user requesting an access from the terminal device connected by way of the network according to an outcome of the verification.

11. The information storage device of claim 1, which includes:
  (a) a rotation detector; and
  (b) a depression detector, wherein when executed by the at least one processor, the instructions cause the processor to:
    (i) in response to a rotation detected by the rotation detector, select a character; and
    (ii) in response to a depression detected by the depression detector, finalize the selected character as one of the characters in the string of characters of the password.

12. The method of claim 5, wherein:
  (a) the first operation includes a rotation detected by a rotation detector; and
  (b) the second operation includes a depression detected by a depression detector.

13. The security system of claim 6, wherein:
  (a) the removable information storage device includes:
    (i) a rotation detector; and
    (ii) a depression detector; and
  (b) wherein when executed by the first processor, the instructions cause the first processor to:
    (i) in response to a rotation detected by the rotation detector, select a character; and
    (ii) in response to a depression detected by the depression detector, finalize the selected character as one of the characters in the string of characters of the password.

14. The method of claim 10, wherein:
  (a) the first operation includes a rotation detected by a rotation detector; and
  (b) the second operation includes a depression detected by a depression detector.

* * * * *